(12) United States Patent
Hawkins et al.

(10) Patent No.: US 9,194,452 B2
(45) Date of Patent: Nov. 24, 2015

(54) HIGH STIFFNESS VIBRATION DAMPING APPARATUS, METHODS AND SYSTEMS

(71) Applicant: The Aerospace Corporation, El Segundo, CA (US)

(72) Inventors: Gary F. Hawkins, Torrance, CA (US); Ching-Yao Tang, Pasadena, CA (US)

(73) Assignee: The Aerospace Corporation, El Segundo, CA (US)

(*) Notice: Subject to any disclaimer, the term of this patent is extended or adjusted under 35 U.S.C. 154(b) by 195 days.

(21) Appl. No.: 13/664,586

(22) Filed: Oct. 31, 2012

(65) Prior Publication Data

US 2014/0117600 A1    May 1, 2014

(51) Int. Cl.
 F16F 13/00    (2006.01)
 F16F 3/12    (2006.01)
 F16F 1/36    (2006.01)

(52) U.S. Cl.
 CPC ............. *F16F 3/12* (2013.01); *F16F 1/3615* (2013.01); *F16F 2228/063* (2013.01)

(58) Field of Classification Search
 CPC ...... F16F 3/12; F16F 13/005; F16F 2228/063
 See application file for complete search history.

(56) References Cited

U.S. PATENT DOCUMENTS

| | | | |
|---|---|---|---|
| 70,446 A * | 11/1867 | Long | 267/30 |
| 1,290,187 A | 1/1919 | Heiman et al. | |
| 1,669,140 A | 5/1928 | Ohlendorf | |
| 1,717,855 A | 6/1929 | Schleiff | |
| 2,156,730 A | 5/1939 | Kuner | |
| 3,508,020 A | 4/1970 | Culver | |
| 3,616,126 A | 10/1971 | Tungseth | |
| 3,809,420 A | 5/1974 | Weller | |
| 3,850,466 A | 11/1974 | Yepis | |
| 3,852,150 A | 12/1974 | Weller | |
| 3,856,615 A | 12/1974 | Dreher | |
| 3,871,636 A | 3/1975 | Boyle | |
| 3,908,378 A | 9/1975 | Wolfe | |
| 3,964,208 A | 6/1976 | Renner et al. | |
| 3,975,023 A | 8/1976 | Inamori | |
| 4,054,312 A | 10/1977 | Strader, Jr. | |
| 4,061,384 A | 12/1977 | Montgomery et al. | |
| 4,357,041 A | 11/1982 | Farris | |
| 4,372,595 A | 2/1983 | Roberts | |
| 4,624,880 A | 11/1986 | Goulding et al. | |

(Continued)

FOREIGN PATENT DOCUMENTS

DE    4131734 A1    4/1993
EP    588719 A1    3/1994

(Continued)

OTHER PUBLICATIONS

T. Mizuno, "Vibration Isolation Systems Using Negative Stiffness," Vibration Control, ISBN 978-953-307-117-6 (Aug. 2010).

(Continued)

*Primary Examiner* — Thomas Irvin
(74) *Attorney, Agent, or Firm* — Henricks, Slavin & Holmes LLP

(57) ABSTRACT

Vibration damping apparatus, systems, objects including such apparatus and systems, and vibration damping methods. The vibration damping involves amplifying a vibration-induced displacement and damping the amplified displacement.

19 Claims, 9 Drawing Sheets

(56) References Cited

U.S. PATENT DOCUMENTS

| | | | |
|---|---|---|---|
| 4,673,170 A * | 6/1987 | Dykema | 267/174 |
| 4,679,792 A | 7/1987 | Straza | |
| 4,681,302 A | 7/1987 | Thompson | |
| 4,707,872 A | 11/1987 | Hessel | |
| 4,922,667 A * | 5/1990 | Kobori et al. | 52/167.2 |
| 4,923,057 A | 5/1990 | Carlson et al. | |
| 4,948,442 A | 8/1990 | Manns | |
| 5,019,439 A | 5/1991 | Momose | |
| 5,044,030 A | 9/1991 | Balaton | |
| 5,083,778 A | 1/1992 | Douglass | |
| 5,128,200 A | 7/1992 | Colley et al. | |
| 5,138,776 A | 8/1992 | Levin | |
| 5,178,357 A * | 1/1993 | Platus | 248/619 |
| 5,217,787 A | 6/1993 | Monahan | |
| 5,251,414 A | 10/1993 | Duke | |
| 5,254,387 A | 10/1993 | Gallucci | |
| 5,256,223 A | 10/1993 | Alberts et al. | |
| 5,257,680 A * | 11/1993 | Corcoran et al. | 188/129 |
| 5,299,807 A | 4/1994 | Hutin | |
| 5,333,861 A | 8/1994 | Mills | |
| 5,358,276 A | 10/1994 | Lane, Jr. | |
| 5,395,674 A | 3/1995 | Schmidt et al. | |
| 5,398,929 A | 3/1995 | Kitaichi | |
| 5,400,296 A | 3/1995 | Cushman et al. | |
| 5,403,007 A | 4/1995 | Chen | |
| 5,435,619 A | 7/1995 | Nakae et al. | |
| 5,444,926 A | 8/1995 | Allen et al. | |
| 5,471,905 A | 12/1995 | Martin | |
| 5,472,761 A | 12/1995 | Goldberg et al. | |
| 5,499,814 A | 3/1996 | Lu | |
| 5,505,453 A | 4/1996 | Mack | |
| 5,573,824 A | 11/1996 | Klocek et al. | |
| 5,667,895 A | 9/1997 | Jenkner | |
| 5,679,439 A | 10/1997 | Schmidt et al. | |
| 5,753,061 A | 5/1998 | Rudy | |
| 5,766,094 A | 6/1998 | Mahaffey et al. | |
| 5,826,350 A | 10/1998 | Wallerstein | |
| 5,848,782 A | 12/1998 | Hein et al. | |
| 5,863,261 A | 1/1999 | Eggiman | |
| 5,914,163 A | 6/1999 | Browne | |
| 5,916,664 A | 6/1999 | Rudy | |
| 5,965,249 A | 10/1999 | Sutton et al. | |
| 5,997,077 A | 12/1999 | Siebels | |
| 6,001,030 A | 12/1999 | Delaney | |
| 6,048,426 A | 4/2000 | Pratt | |
| 6,155,617 A | 12/2000 | Kuenzel | |
| 6,193,615 B1 | 2/2001 | Hirota | |
| 6,244,638 B1 | 6/2001 | Kuczynski et al. | |
| 6,334,818 B1 | 1/2002 | Cameron et al. | |
| 6,364,789 B1 | 4/2002 | Kosmatka | |
| 6,368,231 B1 | 4/2002 | Chen | |
| 6,390,932 B1 | 5/2002 | Kosmatka et al. | |
| 6,438,905 B2 * | 8/2002 | Constantinou | 52/167.3 |
| 6,443,511 B2 | 9/2002 | Braun | |
| 6,447,871 B1 | 9/2002 | Hawkins | |
| 6,460,667 B1 | 10/2002 | Bruck et al. | |
| 6,471,198 B2 * | 10/2002 | Herbst | 267/293 |
| 6,499,570 B2 * | 12/2002 | Chu | 188/129 |
| 6,505,718 B2 * | 1/2003 | Fujita et al. | 188/267 |
| 6,523,872 B2 | 2/2003 | Breed | |
| 6,547,280 B1 | 4/2003 | Ashmead | |
| 6,607,451 B2 | 8/2003 | Kosmatka et al. | |
| 6,641,893 B1 | 11/2003 | Suresh et al. | |
| 6,668,989 B2 | 12/2003 | Reid et al. | |
| 6,685,243 B1 | 2/2004 | Evans | |
| 6,712,410 B2 | 3/2004 | Kudelko et al. | |
| 6,830,793 B2 | 12/2004 | Hawkins et al. | |
| 6,946,180 B2 | 9/2005 | Hawkins | |
| 7,070,030 B2 | 7/2006 | Etcheverry | |
| 7,367,898 B2 | 5/2008 | Hawkins et al. | |
| 7,461,726 B2 | 12/2008 | Hawkins et al. | |
| 7,543,832 B2 * | 6/2009 | Nelson et al. | 280/124.107 |
| 7,647,733 B2 * | 1/2010 | Nakamura et al. | 52/167.1 |
| 7,708,653 B2 | 5/2010 | Hawkins et al. | |
| 7,758,089 B2 | 7/2010 | Lee et al. | |
| 8,136,309 B2 * | 3/2012 | Rahimian | 52/167.3 |
| 2002/0172783 A1 | 11/2002 | Hawkins et al. | |
| 2004/0250340 A1 | 12/2004 | Piper | |
| 2005/0009623 A1 | 1/2005 | Dickinson | |
| 2006/0154746 A1 | 7/2006 | Hagood et al. | |
| 2006/0191403 A1 | 8/2006 | Hawkins et al. | |
| 2007/0068755 A1 | 3/2007 | Hawkins et al. | |
| 2008/0032813 A1 | 2/2008 | Hagood et al. | |
| 2008/0076595 A1 | 3/2008 | Lai | |
| 2008/0268978 A1 | 10/2008 | Hawkins et al. | |
| 2009/0160203 A1 | 6/2009 | Garg et al. | |
| 2010/0244471 A1 | 9/2010 | Wiedermann et al. | |
| 2010/0313745 A1 | 12/2010 | Hawkins et al. | |
| 2011/0278425 A1 * | 11/2011 | Park | 248/636 |
| 2012/0139172 A1 | 6/2012 | Hawkins et al. | |
| 2014/0048989 A1 * | 2/2014 | Platus | 267/140.5 |
| 2015/0165852 A1 * | 6/2015 | Suissa | 280/124.106 |

FOREIGN PATENT DOCUMENTS

| | | |
|---|---|---|
| JP | 55094863 A | 7/1980 |
| JP | 57172848 A | 10/1982 |
| JP | 60131349 A | 7/1985 |
| JP | 04218445 A | 8/1992 |
| WO | WO 2004006702 | 1/2004 |
| WO | WO 2006088500 | 8/2006 |

OTHER PUBLICATIONS

R. S. Lakes, "Extreme damping in compliant composites with a negative stiffness phase," Philosophical Magazine Letters, vol. 81, No. 2, pp. 95-100 (2001).

R. S. Lakes, "Extreme damping in composite materials with a negative stiffness phase," Physical Review Letters, vol. 86, No. 13, pp. 2897-2900 (Mar. 2001).

* cited by examiner

HIGH STIFFNESS VIBRATION DAMPING APPARATUS, METHODS AND SYSTEMS

STATEMENT OF GOVERNMENT INTEREST

This invention was made with government support under Contract No. W911 NF-11-1-0004. The government has certain rights in the invention.

BACKGROUND

1. Field

The present inventions relate generally to vibration damping.

2. Related Art

Vibration damping materials are employed in a wide variety of mechanical systems to damp vibrations that can degrade performance of the systems. The present inventors have determined conventional vibration damping materials are susceptible to improvement. For example, low stiffness materials are commonly used for vibration damping because their flexible lattices are inherently better at dissipating energy. In some instances, however, devices must be securely held in place despite the fact that the devices are sensitive to, or are the source of, vibrations. Launch vehicle adaptors, motor mounts, and high precision moving devices are examples of such devices. Low stiffness materials are less than optimal here because they permit movement, as are conventional high stiffness materials because they have relatively poor damping characteristics.

SUMMARY

A vibration damping apparatus in accordance with one embodiment of a present invention includes a displacement conversion device configured to convert displacement in a first direction into displacement in a second direction, a motion amplifier responsive to displacement in the second direction, and a motion damper operably connected to the motion amplifier. The present inventions also include systems and objects with such vibration damping apparatus.

A vibration damping method in accordance with one embodiment of a present invention includes the steps of converting a vibration-induced displacement in a first direction into a displacement in a second direction, amplifying the displacement in the second direction to create an amplified displacement, and damping the amplified displacement.

There are a variety of advantages associated with such a vibration damping apparatus, systems, objects and methods. For example, the present vibration damping apparatus may be configured such that it is relatively stiff in the direction of the vibration forces (e.g., the first direction), while providing better damping characteristics than have been heretofore associated with materials and structures having the same stiffness in the direction of the vibration forces.

BRIEF DESCRIPTION OF THE DRAWINGS

Detailed description of preferred embodiments of the inventions will be made with reference to the accompanying drawings.

DETAILED DESCRIPTION OF EXEMPLARY EMBODIMENTS

The following is a detailed description of the best presently known modes of carrying out the inventions. This description is not to be taken in a limiting sense, but is made merely for the purpose of illustrating the general principles of the inventions.

Figure 1:
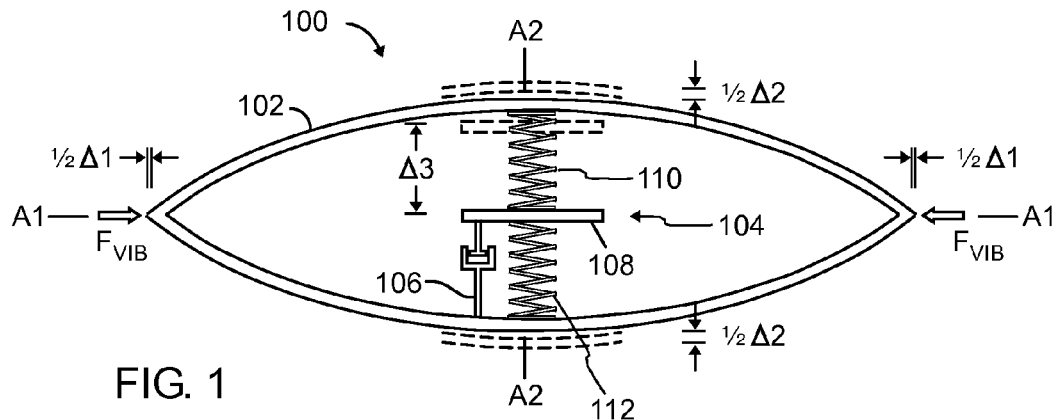
FIG. 1 is a schematic diagram of a damping apparatus in accordance with one embodiment of a present invention.
Figure 2:
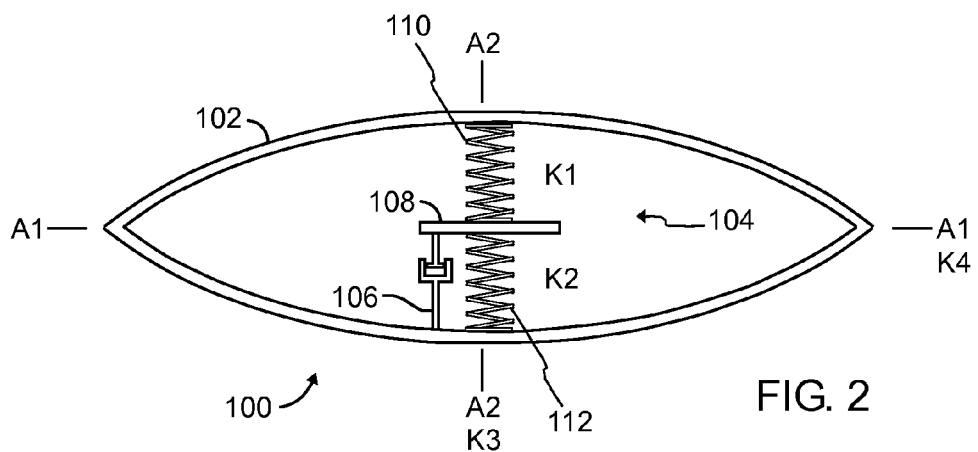
FIG. 2 is a schematic diagram of a damping apparatus in accordance with one embodiment of a present invention.

A vibration damping apparatus (or "damping apparatus") in accordance with one embodiment of a present invention is generally represented by reference numeral 100 in FIGS. 1 and 2. The exemplary damping apparatus 100 includes a displacement conversion device 102, a motion amplifier (or "displacement amplifier") 104, and a motion damper (or "displacement damper") 106, each of which is discussed in greater detail below. Briefly, the displacement conversion device 102 converts displacement thereof along a first axis A1 (or "in a first direction") caused by vibrational force $F_{VIB}$ into displacement along a second axis A2 (or "in a second direction"). The first and second axes A1 and A2 (or "different directions") may be transverse (including perpendicular as shown) or otherwise non-coaxial. The period of the back and forth vibration-induced displacement along each axis is the same. In at least some instances, the magnitude of the displacement along the second axis A2 (i.e., the displacement distance $\Delta 2$) is greater than the magnitude of the displacement along the first axis A1 (i.e., the displacement distance $\Delta 1$) and, in view of the fact that the periods are the same, the velocity of the displacement along the second axis is greater than the velocity of the displacement along the first axis.

The motion amplifier 104 includes an interface member 108 that also moves along the second axis A2 and whose motion is damped by the motion damper 106. The displacement of the interface member 108 along the second axis A2 is, relative to the displacement of the displacement conversion device along the first axis A1, amplified both in magnitude and velocity. In particular, the motion amplifier 104 creates displacement (i.e., the displacement distance Δ3) at the interface member 108 that is greater than the displacement distance Δ2 in response to the displacement of portions of the displacement conversion device 102 along the second axis A2. The period of the back and forth vibration-induced displacement of the interface member 108 is the same as that of the displacement conversion device 102 along axes A1 and A2. As such, the velocity of the interface member 108 is greater than the velocity of the displacement conversion device 102 along axis A1 and along axis A2. Thus, in the illustrated implementation, the vibration-induced displacement (and velocity) that occurs along axis A1 is amplified, and then the amplified displacement (and velocity) is itself amplified.

Given that damping force is equal to the damping coefficient multiplied by the velocity to the damped object ($F_d=cv$), damping the twice amplified motion at the interface member 108 results in far more effective damping of vibrations applied to damping apparatus 100 than would be the case if the motion damper 106 was acting directly on movement of the displacement conversion device 102 along the first axis A1 or the second axis A2. As such, the present vibration damping apparatus 100 may be configured such that it effectively damps vibrations despite being relatively stiff in the direction of the vibration forces.

The exemplary motion amplifier 104 includes a positive spring 110 (i.e., a spring with a positive spring constant K1) and a negative spring 112 (i.e., a spring with a negative spring constant K2). As used herein, a "negative spring" is spring which has a stress-strain (or load-displacement) curve with a negative slope. In some instances, the negative slope will be over only a portion of the stress-strain (or load-displacement) curve. Here, the spring may be selected, preloaded and/or physically restrained such that it operates within the region of negative slope. As is explained below, the spring constants K1 and K2 are close to, but not exactly, equal and opposite in value. The absolute value (or "magnitude") of the negative spring constant K2 is slightly less than the absolute value (or "magnitude") of the positive spring constant K1. As used herein, "slightly less" is 1% to 10% less.

By way of background, it should be noted that when positive and negative springs which have spring constants that are equal in absolute value, i.e., have equal and opposite spring constants, are combined in parallel the resulting spring constant is zero. Conversely, when two springs of equal and opposite spring constant are combined in series, the resulting spring constant is infinity. If an outside force is applied to the positive/negative spring series, the overall length of the spring series remains constant, but the interface between the positive and negative springs will move as the positive spring compresses and the negative spring expands in response to the force. The inventors herein have determined that this phenomenon is magnified when there is slight difference between the absolute values of the spring constants in the positive/negative spring series. The magnitude of the interface displacement is inversely proportional to the percent difference between the absolute values of the positive and negative spring constants. Put another way, motion amplification=K1/(|K1|−|K2|). If, for example, the percent difference between the spring constant absolute values is 2%, with a slightly positive overall spring constant, then the displacement at the interface will be 50 times the combined displacement at the ends of the positive/negative spring series. The present inventors have also determined that the positive/negative spring series, which is slightly positive in overall spring constant, is relatively unstable. As such, stabilization of a positive/negative spring series may be required.

Referring more specifically to FIG. 2, the configuration of the displacement conversion device 102 in the illustrated embodiment is such that it defines a spring constant K3 (or "stiffness") in the direction of the second axis A2 and a spring constant K4 (or "stiffness") in the direction of the first axis A1. Spring constant K3 is a positive spring constant that stabilizes the motion amplifier 104 that includes positive and negative springs 110 and 112. Spring constant K4 is a positive spring constant that defines the stiffness of the damping apparatus 100 in the direction of the vibrational force $F_{VIB}$. Spring constant K3 is greater than the effective spring constant of the positive/negative spring series $K_{EFF}$, where $K_{EFF}=(K1K2)/(K1+K2)$. For example, $K_{EFF}$ may range from 0.5 K3 to 0.9 K3. Spring constant K4, on the other hand, should be high enough, given the expected magnitude of the vibrational force $F_{VIB}$ associated with the intended application, that the displacement along the first axis A1 (i.e., the displacement distance Δ1) is minimized, but not so high that the displacement is non-existent, as it is the displacement along the first axis A1 that is amplified along axis A2 for damping.

Figure 2A:
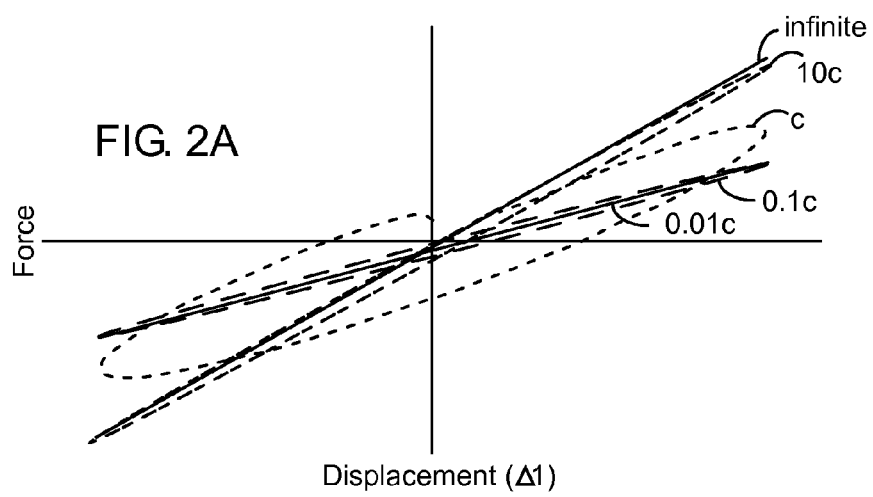
FIG. 2A is a graph showing force v. displacement curves for various damping coefficients.

For any particular damping apparatus, there is an optimal value for the damping coefficient c of the motion damper 106, i.e., a value that results in the most damping for that system. FIG. 2A shows the force versus displacement curves for otherwise identical damping apparatuses with different damping coefficients, including the optimum damping coefficient c for that apparatus, damping coefficients that are less (0.1 c and 0.01 c) and damping coefficients greater (10 c and "infinite," i.e., high enough that the interface member 108 does not move). The most damping occurs where the area within the associated hysteresis curve is the greatest. FIG. 2A also shows that damping apparatus in accordance with the present inventions can be configured (or "tuned") for a particular application. Some applications may, for example, call for greater stiffness and this can be achieved by increasing the damping coefficient with the understanding that the damping will be less than optimal.

Figure 3:
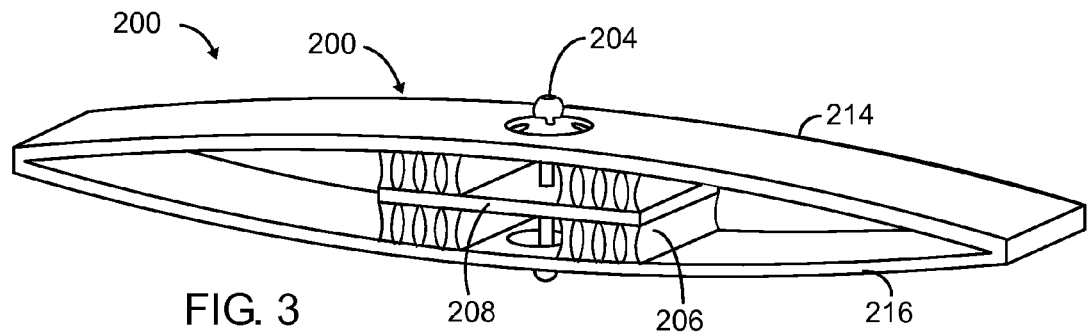
FIG. 3 is a perspective view of a damping apparatus in accordance with one embodiment of a present invention.
Figure 4:
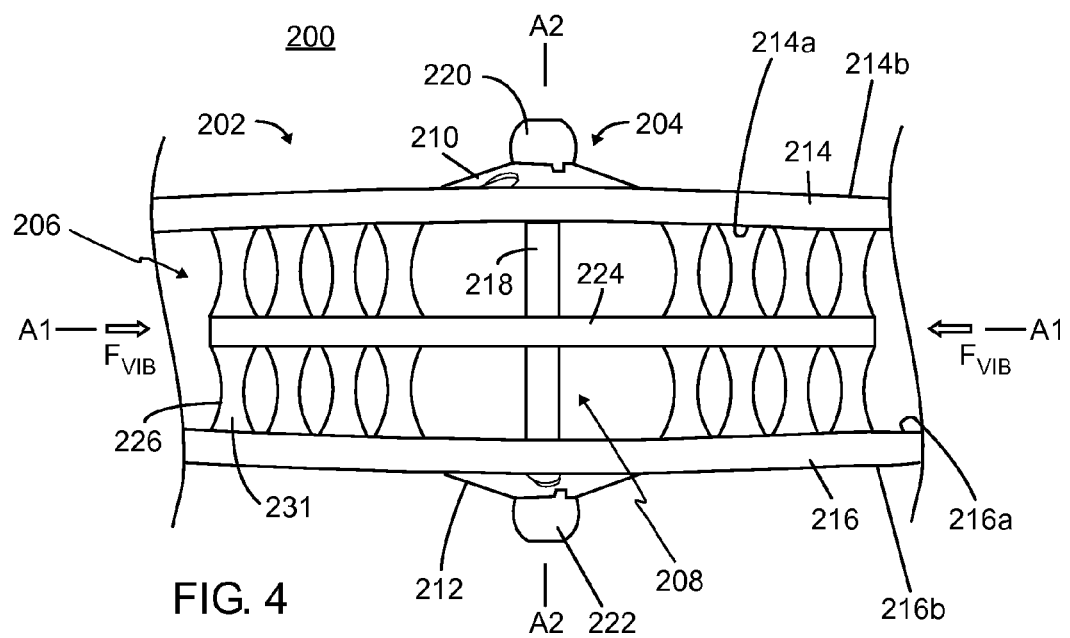
FIG. 4 is a side view of a portion of the damping apparatus illustrated in FIG. 3.

Turning to FIGS. 3 and 4, the exemplary damping apparatus 200 illustrated therein operates in the manner described above and includes structures that are functionally similar to those illustrated in FIGS. 1 and 2. To that end, the exemplary damping apparatus 200 includes a displacement conversion device 202, a motion amplifier 204 with an interface 208, and a motion damper 206. The displacement conversion device 202 converts (and amplifies) displacement thereof along the first axis A1 caused by vibrational force $F_{VIB}$ into greater displacement (and velocity) along the second axis A2, the motion amplifier 204 further amplifies the already amplified displacement (and velocity) along the second axis A2, and the twice amplified motion is then damped by the motion damper 206 at the motion amplifier interface 208.

The exemplary displacement conversion device 202 includes a pair of arcuate members 214 and 216, with inner surfaces 214a and 216a and outer surfaces 214b and 216b, which are secured to one another at their longitudinal ends. The arcuate members 214 and 216 function like leaf springs, and the length, width, thickness, arc and materials may be selected such that, when combined, the displacement conversion device 202 will have the desired spring constant K3 (along axis A2) and spring constant K4 (along axis A1). The arcuate members 214 and 216 may be formed from any material, or combination of materials (e.g., a multi-layer composite), that is appropriate for the intended application. Suitable materials include, but are not limited to, plastics, metals such as aluminum and steel, and composites such as fiber reinforced resin composites. The arcuate members 214 and 216 may also be identical (as shown) or may be different in one or more aspects such as, for example, their curvature, thickness or material.

In addition to the interface 208, the exemplary motion amplifier 204 includes a positive spring 210 and a negative spring 212. The exemplary springs 210 and 212 are positioned on the outer surfaces 214b and 216b of the conversion device arcuate members 214 and 216 in the illustrated embodiment. The outer surfaces 214b and 216b support the outer rims of the springs 210 and 212 and include indentations under the springs that allow the springs to compress. The interface 208 mounts the springs 210 and 212 to the arcuate members 214 and 216 and, to that end, includes a rod 218 and a pair of end caps 220 and 222 that are secured to the rod. The rod 218 extends through the springs 210 and 212 and the arcuate members 214 and 216, and the end caps 220 and 222 engage the springs. So arranged, the illustrated interface 208 and springs 210 and 212 are connected in series. i.e., spring-interface-spring. The rod 218 is also movable relative to the arcuate members 214 and 216. The connectors between the rod 218 and end caps 220 and 222 may be threaded connectors so that the distance between the end caps 220 and 222 can be adjusted to, for example, add and/or adjust a preload on the springs 210 and 212. Such preloading is discussed below with reference to FIGS. 5-7. The interface 208 also includes a damper engagement device 224, which may be a flat plate as it is in the illustrated embodiment, that is secured to (and therefore moves with) the rod 218.

Figure 4A:
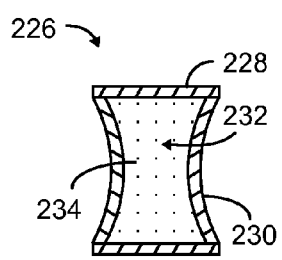
FIGS. 4A and 4B are sections views of an exemplary fluid-filled machine.
Figure 4B:
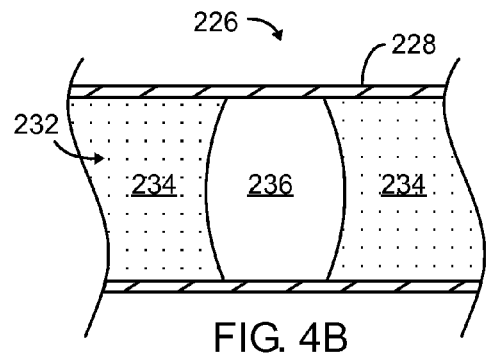

Turning to the motion damper 206, a wide variety of dampers may be employed. Such dampers may include, but are not limited to, sheets of high damping materials such as rubber, silicone, and foams (e.g., closed cell foams), frictional dampers, and mechanical apparatus such as shock absorbers and other hydraulic and pneumatic dampers. In the illustrated implementation, and although the present inventions are not so limited, the motion damper 206 includes a plurality of hollow hourglass-shaped machines 226 which are filled with regions of incompressible fluid that are separated from one another by a compressible material or gas bubble. Briefly, and referring to FIGS. 4A and 4B, the exemplary machines 226 may include a pair of opposing planar walls 228 that are connected by transverse walls 230, which are semi-rigid or flexible, and have a curved shape. End walls 231 (FIG. 4) are located at each longitudinal end. The walls 228 and 230 together define a generally hourglass-shaped internal space 232 that is filled with one or more volumes of an incompressible fluid 234 (e.g., water, silicone oil, non-Newtonian fluids such as shear thinning fluids and shear thickening fluids, hydraulic fluid, and magneto rheological fluids) and one or more volumes of a compressible fluid 236 (e.g., air or another inert gas). When the planar walls 228 are subjected to compressive forces, the transverse walls 230 may bend and bow inwards into the internal space 232 and the compressible fluid 236 will be compressed to accommodate encroachment of the incompressible fluid 234. In other implementations, the entire internal space 232 may be filled with a gas such as air. Alternatively, the entire internal space 232 may be filled with an incompressible fluid and the end walls 231 may be configured to bulge outwardly. Additional information concerning such dampers is disclosed in U.S. Pat. No. 6,830,793, which is incorporated herein by reference in its entirety.

The machines 226 are secured to arcuate member inner surfaces 214a and 216a and to the damper engagement device 224. As the rod 218 and damper engagement device 224 moves back and forth, some of the machines 226 will be in tension and some of the machines will be in compression. As such, the machines 226 will not add or subtract to the positive spring constant K1. If on the other hand the machines were only located on one side of the damper engagement device 224, then the spring constant of the machines would form part of the positive spring constant K1.

Figure 5:
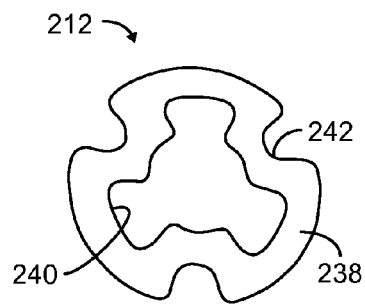
FIG. 5 is a plan view of a spring that may be employed in at least some damping apparatus in accordance the present inventions.
Figure 6:
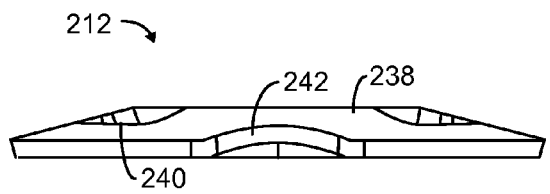
FIG. 6 is a side view of the spring illustrated in FIG. 5.
Figure 7:
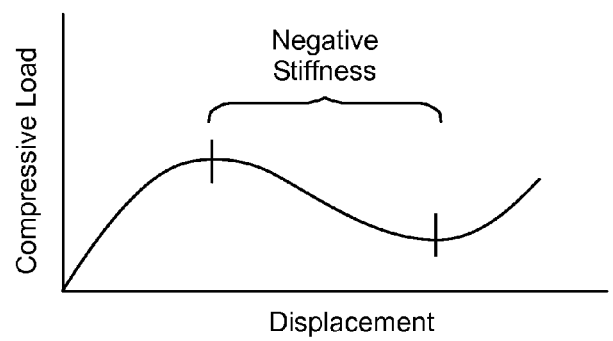
FIG. 7 is a force v. displacement curve for an exemplary spring.
Figure 8:
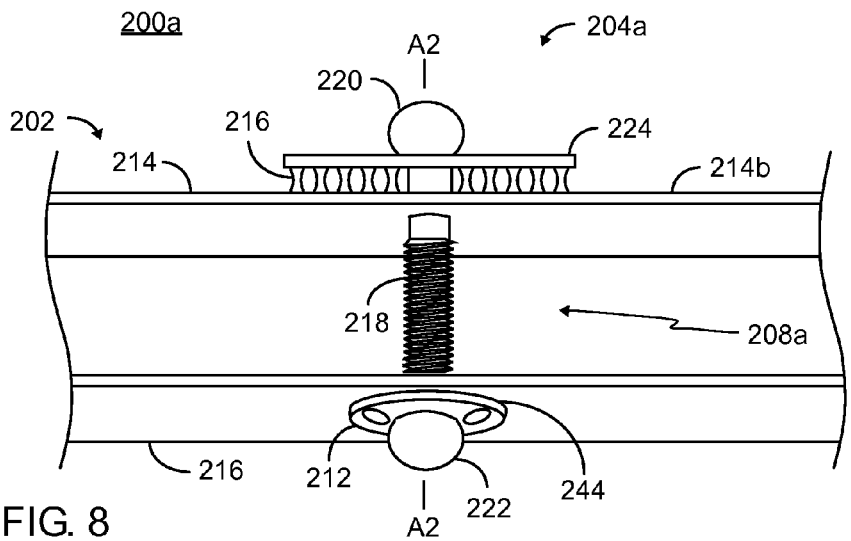
FIG. 8 is a side view of a portion of damping apparatus in accordance with one embodiment of a present invention.

The positive and negative springs 210 and 212 are not limited to any particular springs, so long as the springs have the requisite positive or negative spring constants. Referring to FIGS. 5 and 6, and although the present inventions are not so limited, the exemplary negative spring 212 may be a conical disc 238 with stress-relieving cutouts 240 and 242 on the inner and outer diameters. Negative springs of this type are available, for example, from Associated Spring under the trade name Clover® Dome. Positive spring 210 is also a conical disc spring with stress-relieving cutouts on the inner and outer diameters in the illustrated embodiment. Positive springs of this type are also available from Associated Spring under the trade name Clover® Dome. As illustrated for example in FIG. 7, there are some instances where a negative spring will have a negative spring constant over only a portion of its load v. displacement curve. Here, the negative spring may be preloaded by, for example, selecting component dimensions, adding a spacer (note spacer 244 in FIG. 8) and/or adjusting the end caps 220 and 222 in such a manner that the negative spring is compressed into the portion of the load v. displacement curve that has a negative slope. It may also be desirable to prevent the negative spring from being compressed beyond the portion of the load v. displacement curve that has a negative slope. This may be accomplished by, for example, mechanical stops that prevent compression past a particular point or an overall damping apparatus configuration where, for the intended application, one would not expect displacement beyond the portion of the curve with the negative slope.

In some implementations, positive spring and motion damper functionalities may be performed by a common structure. For example, fluid fill machines such as those described above with reference to FIGS. 3 and 4 may be used to provide positive spring and motion damper functionalities. One example of a damping apparatus with such an arrangement is generally represented by reference numeral 200a in FIG. 8. Damping apparatus 200a is substantially similar to damping apparatus 200 in form and function and similar elements are represented by similar reference numerals. For example, damping apparatus 200a includes a displacement conversion device 202 with a pair of arcuate members 214 and 216, and a motion amplifier 204a with a negative spring 212, a rod 218, and end caps 220 and 222. Here, however, the damper engagement device 224 of the interface 208a is not located between the arcuate members 214 and 216 and, instead, abuts the end cap 220. A plurality of fluid-filled hourglass-shaped machines 226, which function as both a positive spring and a damper, are located between the arcuate member outer surface 214b and the damper engagement device 224. In particular, and referring to FIGS. 4A and 4B, the curved transverse walls 230 function as a positive spring and the compressible fluid 236 functions as a damper. It should also be noted that an annular spacer 244 is located between the negative spring 212 and the arcuate member 216 to support the outer rim of the negative spring away from the arcuate member so that the negative spring can compress.

Figure 9:
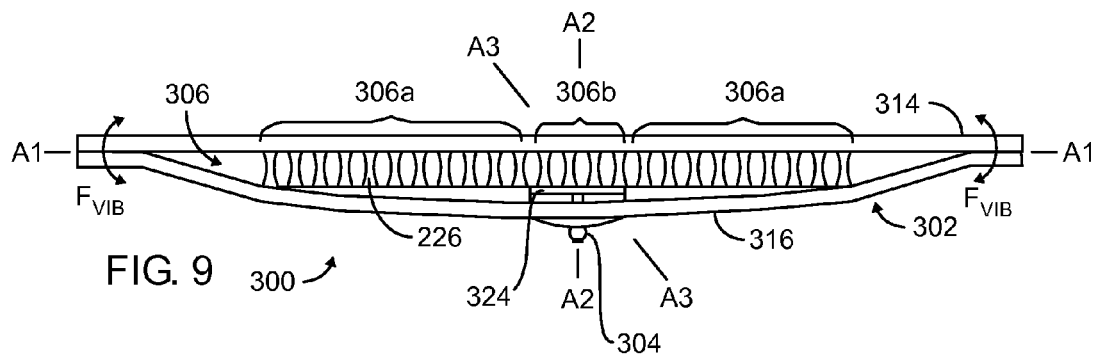
FIG. 9 is a side view of a damping apparatus in accordance with one embodiment of a present invention.
Figure 10:
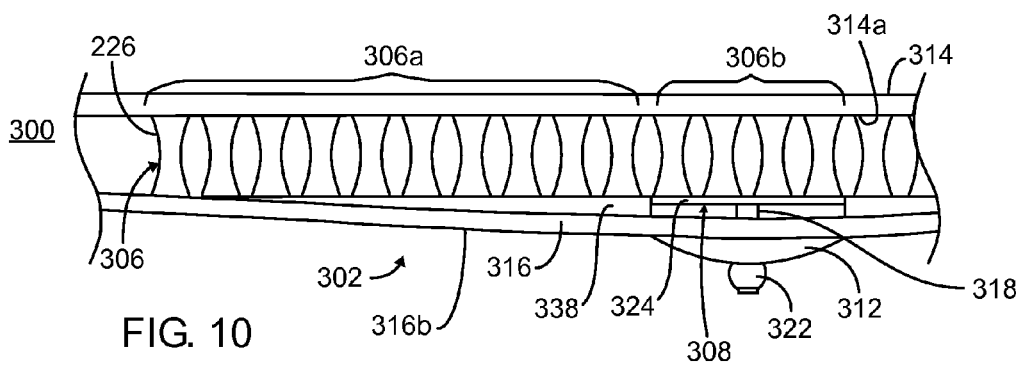
FIG. 10 is a side view of a portion of the damping apparatus illustrated in FIG. 9.

Another exemplary damping apparatus is generally represented by reference numeral 300 in FIGS. 9 and 10. Damping apparatus 300 is substantially similar to damping apparatus 200 and damping apparatus 200a in various aspects of their form and function, and similar elements are represented by similar reference numerals. For example, damping apparatus 300 includes a displacement conversion device 302, a motion amplifier 304, and a motion damper 306. There is also a plurality of the above-described fluid-filled machines 226, which have dual positive spring and damping functionality. Here, however, the displacement conversion device 302 has a half-leaf configuration with a planar member 314 and an arcuate member 316. Such a configuration is better suited for vibration based displacement that tends to bend the damping apparatus 300 in the manner and direction identified by the arrows in FIG. 9. Such bending is about axis A3, which is perpendicular to both axis A1 and axis A2, and results in some displacement in the directions of the first and second axes A1 and A2. The motion amplifier 304 includes positive and negative springs and an interface, and creates an amplified displacement (as compared to the displacement along axis A2) at the interface. Here, the positive spring is defined by the transverse walls 230 (FIG. 4A) of the machines 226 that are located against and secured to the planar member inner surface 314a and a damper engagement device 324, and the negative spring 312 is carried on the arcuate member outer surface 316b. The exemplary motion amplifier interface 308 has a rod 318 that extends through and is movable relative to the arcuate member 316, a single end cap 322 that secures the negative spring 312, and the damper engagement device 324 that is secured to (and therefore moves with) the rod 318. Turning to the motion damper 306, the exemplary motion damper includes a pair of dampers 306a that act directly on the displacement conversion device 302 and are incorporated into K3, and a damper 306b that acts on the amplified motion associated with the motion amplifier 304. In the illustrated implementation, the dampers 306a and 306b are each defined by the compressible fluid 236 (FIG. 4B) within the machines 226. Here too, the damper engagement device 324 is a flat plate. In those instances where it is desirable to provide a flat surface for the machines 226 in dampers 306a, a shim 338 with curved and flat surfaces may be provided.

The present vibration damping apparatus may be incorporated into (or used in combination with) a wide variety of systems and objects, as is described below with reference to FIGS. 11-20. The systems illustrated in FIGS. 11-20 are presented for purposes of example only, and the present inventions are not limited to such systems and objects.

Figure 11:
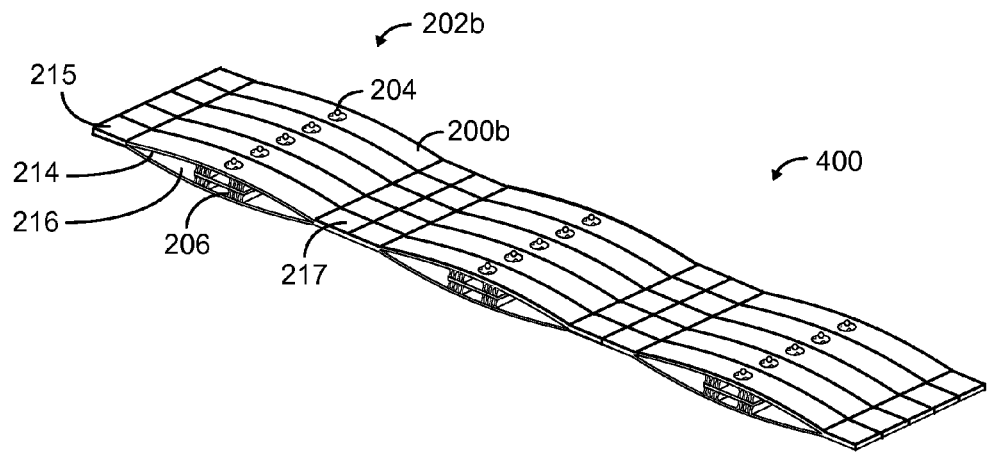
FIG. 11 is a perspective view of a damping system in accordance with one embodiment of a present invention.

A structural plate, such as the structural plate 400 illustrated in FIG. 11, is one example of a vibration damping system that includes a plurality of the present vibration damping apparatuses. The exemplary structural plate 400 includes a plurality of individual vibration damping apparatuses 200b arranged in row and columns, i.e., end-to-end and side-to-side. Three rows of five damping apparatuses 200b are shown in the illustrated embodiment. Systems with a single or column may also be provided. The damping apparatuses 200b are essentially identical to the damping apparatus 200 in structure and function and similar elements are used to represent similar reference numerals. Here, however, the displacement conversion device 202b in each apparatus includes ends tabs 215 and 217 where the arcuate members 214 and 216 are connected to one another. The displacement conversion devices 202b are secured adjacent displacement conversion devices. Welding, adhesive, mechanical fasteners, or any other suitable instrumentality may be used to connect the damping apparatuses 200b to one another. In other implementations, the arcuate member 214 (and/or the arcuate member 216) for two, more than two, or all of the damping apparatuses 200b may be formed from a single piece of material that is sized and shaped so as to define a plurality of arcuate members. Other vibration damping apparatuses, such as damping apparatuses 200, 200a and 300, may be employed in a structural plate in place of the damping apparatuses 200b. Also, although the exemplary structural plate 400 employs a plurality of identical damping apparatuses, other structural plates may employ damping apparatuses that differ in one or more aspects. Also, a plurality of structural plates may be combined, e.g., into a T-shape or an I-beam.

Figure 12:
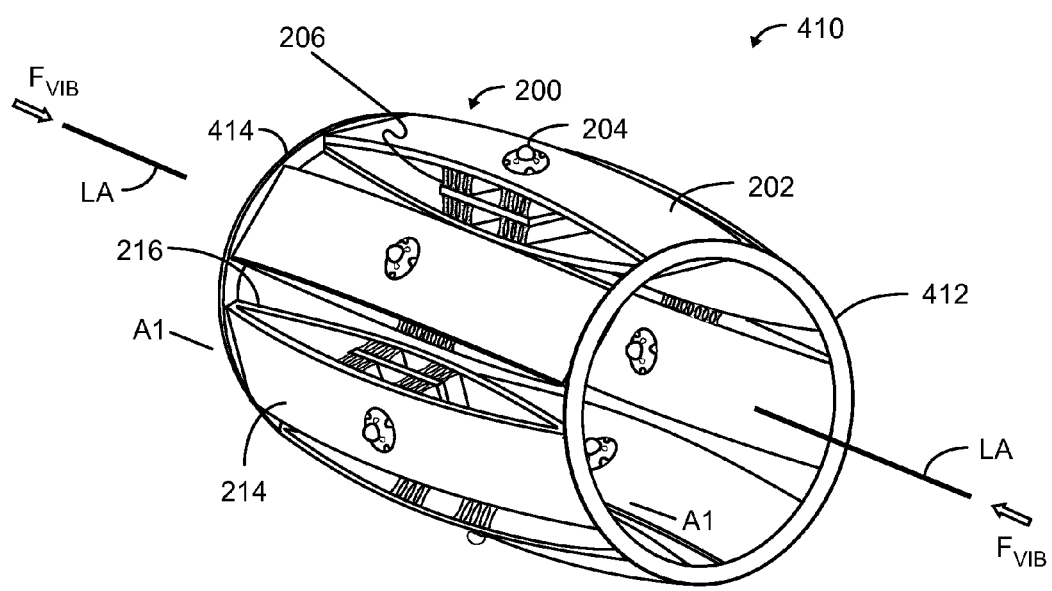
FIG. 12 is a perspective view of a damping system in accordance with one embodiment of a present invention.

A structural tube, such as the structural tube 410 illustrated in FIG. 12, is another example of a vibration damping system that includes a plurality of the present vibration damping apparatuses. The exemplary structural tube 410 includes a plurality of individual vibration damping apparatuses 200 positioned about the longitudinal axis LA. The first axis A1 of each damping apparatus 200 is parallel to the longitudinal axis LA. The longitudinal ends of the damping apparatuses 200 are fixed relative to one another and, in the illustrated embodiment, are secured to anchor rings 412 and 414. The structural tube 410 is intended to be oriented such that the longitudinal axis LA, and the first axes A1, are parallel to the vibration forces $F_{VIB}$. Welding, adhesive, mechanical fasteners, or any other suitable instrumentality may be used to connect the damping apparatuses 200 to the anchor rings 412 and 414. Other vibration damping apparatuses, such as damping apparatuses 200a, 200b and 300, may be employed in a structural tube in place of the damping apparatuses 200. Structural tubes may also be formed from columns of vibration damping apparatuses that are secured to one another end to end. Also, although the exemplary structural tube 410 employs a plurality of identical damping apparatuses, other structural tubes may employ damping apparatuses that differ in one or more aspects. A bicycle seat post is one example of device that may be formed by the structural tube 410.

Figure 13:
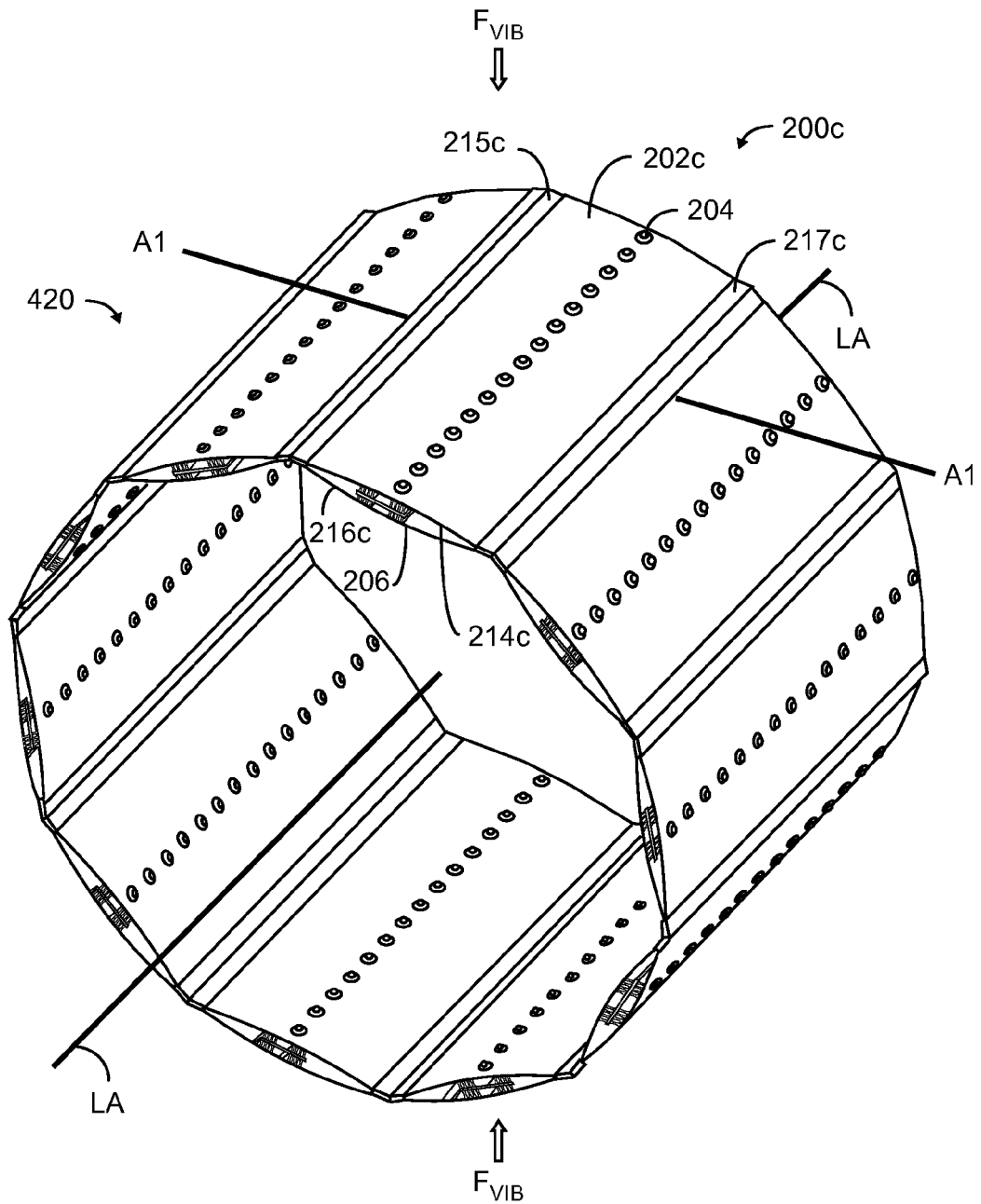
FIG. 13 is a perspective view of a damping system in accordance with one embodiment of a present invention.

A structural tube, such as the structural tube 420 illustrated in FIG. 13, is another example of a vibration damping system that includes a plurality of the present vibration damping apparatuses. The exemplary structural tube 420 includes a plurality of individual vibration damping apparatuses 200c positioned about the longitudinal axis LA. The first axis A1 of each damping apparatus 200c is tangential to the longitudinal axis LA. So configured, vibrational forces $F_{VIB}$ that are perpendicular to the longitudinal axis LA cause displacement along the first axes A1 of the damping apparatuses 200c. The damping apparatuses 200c are essentially identical to the damping apparatus 200b and similar elements are used to represent similar reference numerals. Here, however, the displacement conversion devices 202c are relatively long in the direction parallel to the longitudinal axis LA, and include relatively long arcuate members 214c and 216c and end tabs 215c and 217c. Each damping apparatus 200c also includes a plurality of motion amplifiers 204 and associated motion dampers 206. Welding, adhesive, mechanical fasteners, or any other suitable instrumentality may be used to connect the damping apparatuses 200c to one another. Other vibration damping apparatuses, such as damping apparatuses 200, 200a, 200b and 300, may be employed in a structural tube in place of the damping apparatuses 200c. Also, although the exemplary structural tube 420 employs a plurality of identical damping apparatuses, other structural tubes may employ damping apparatuses that differ in one or more aspects.

Figure 14:
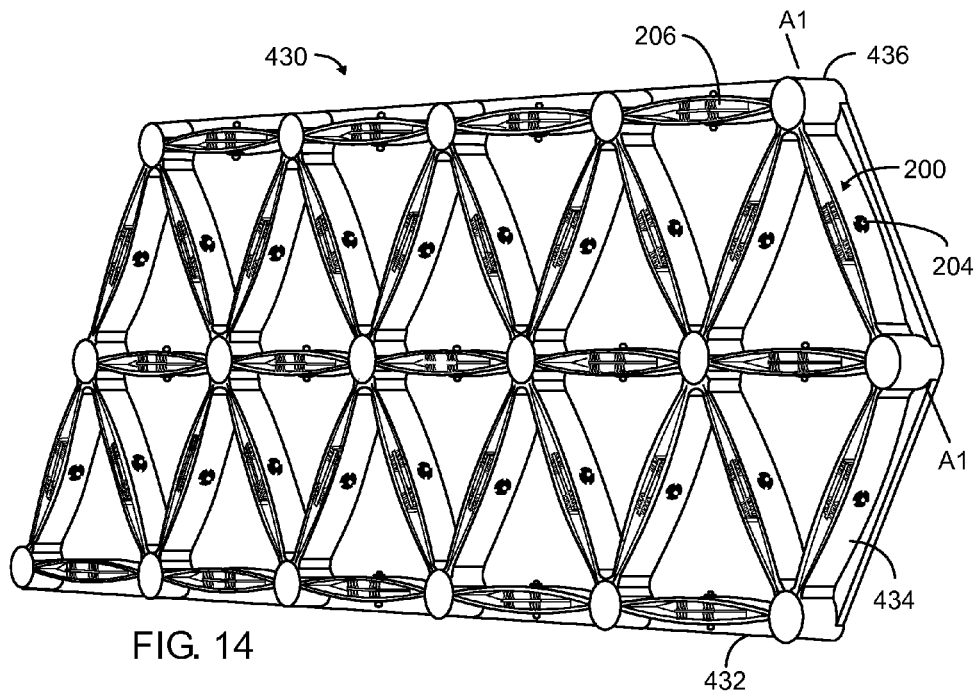
FIG. 14 is a perspective view of a damping system in accordance with one embodiment of a present invention.

Other examples of vibration damping systems are grid systems such as the isogrid system 430 illustrated in FIG. 14. The exemplary isogrid system 430 includes a plate 432 and a plurality of triangular trusses 434 that are formed from damping apparatuses 200. So arranged, the triangular trusses 434 perform a stiffening function as well as the above described vibration damping function. Vibrational forces acting on the plate 432 are transferred to the longitudinal ends of the damping apparatuses 200, in the direction of axis A1, by way of the anchor posts 436 that define the corners of the triangular trusses 434. The damping apparatuses 200 are connected to anchor posts 436, but are not directly connected to the plate 432. The plate 432 may be part of the structure whose vibrations are being damped, and the plate may be planar or curved. By way of example, by not limitation, a curved plate (or a plurality of connected curved plates) may define a cylindrical shape so that the structure may be employed in a rocket or other launch vehicle. Although the trusses 434 in the exemplary system 430 are equilateral triangles, the present systems are not so limited. Other patterns and arrangements including, but not limited to, squares, octagons and other geometric shapes, parallels, diagonals and combinations thereof (e.g., z-shapes), may be employed. Other vibration damping apparatuses, such as damping apparatuses 200a-c and 300, may be employed in the grid system in place of the damping apparatuses 200. Also, although the exemplary isogrid system 430 employs a plurality of identical damping apparatuses, other systems may employ damping apparatuses that differ in one or more aspects.

Figure 15:
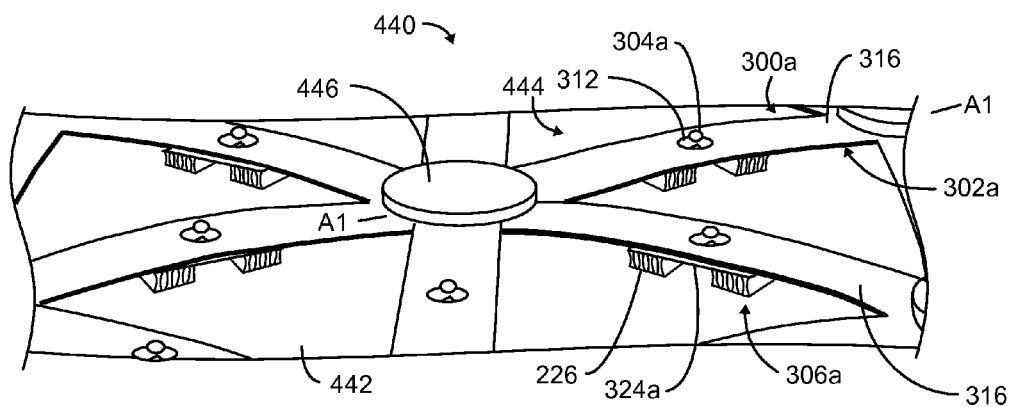
FIG. 15 is a perspective view of a damping system in accordance with one embodiment of a present invention.

Another exemplary grid system is the isogrid system 440 illustrated in FIG. 15. The exemplary isogrid system 440 includes a plate 442 and a plurality of triangular trusses 444 that are formed from damping apparatuses 300a. The damping apparatuses 300a are similar to apparatus 300 in form and function, and similar elements are represented by similar reference numerals. For example, each damping apparatus 300a includes a displacement conversion device 302a with an arcuate member 316, a motion amplifier 304a with a negative spring 312, a motion damper 306a with a plurality of fluid-filled machines 226 that perform the positive spring and damping functions in the manner described above. A damper engagement device 324a is secured to the motion amplifier interface rod (not shown). In contrast to damping apparatus 300, however, the damping apparatus 300a omits the planar member 314 (FIG. 9) and is configured to be mounted onto the surface of the underlying structure (e.g., the inner surface of the plate 442). The ends of the arcuate members 316 are secured to the plate 442 by anchor posts 446 that define the corners of the triangular trusses 444. The plate 442 may be planar or curved. By way of example, by not limitation, a curved plate (or a plurality of connected curved plates) may define a cylindrical shape so that the structure may be employed in a rocket or other launch vehicle. The machines 226 are located between the arcuate member 316 and the damper engagement device 324a, and between the damper engagement device and the plate 442. In other implementations, the machines 226 will be on only one side of the damper engagement device 324a. Although the trusses 444 in the exemplary system 440 are equilateral triangles, the present systems are not so limited. Other patterns and arrangements including, but not limited to, squares, octagons and other geometric shapes, parallels, diagonals and combinations thereof (e.g., z-shapes), may be employed. Other vibration damping apparatuses, such as damping apparatuses 200-200c and 300, may be employed in the grid system in place of the damping apparatuses 300a. Here, the anchor posts 446 would also provide a spacing function to suspend the damping apparatuses relative to the plate 442. Also, although the exemplary isogrid system 440 employs a plurality of identical damping apparatuses, other systems may employ damping apparatuses that differ in one or more aspects.

Figure 16:
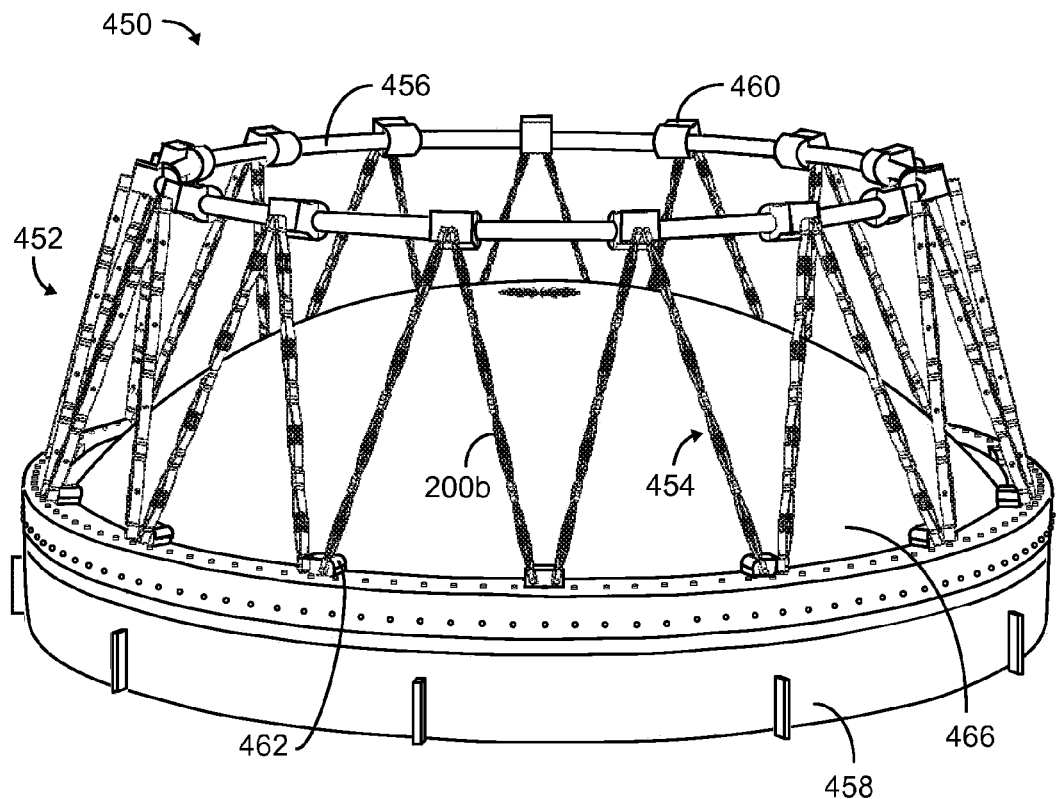
FIG. 16 is a perspective view of a payload attach fitting in accordance with one embodiment of a present invention.

Other examples of vibration damping systems are strut systems, such as the strut system 452 in the payload attach fitting (or "forward adapter") 450 illustrated in FIG. 16. The strut system 452 includes a plurality of struts 454, and each strut includes a plurality of damping apparatuses 200b. Other aspects of the payload attach fitting 450 include the payload interface 456 and the spacecraft interface ring 458 which are located at opposite ends of the strut system 452. The struts 454 are connected to anchors 460 and 462 on the payload interface 456 and spacecraft interface ring 458. The vehicle fuel tank 466 is also visible in FIG. 16.

Figure 17:
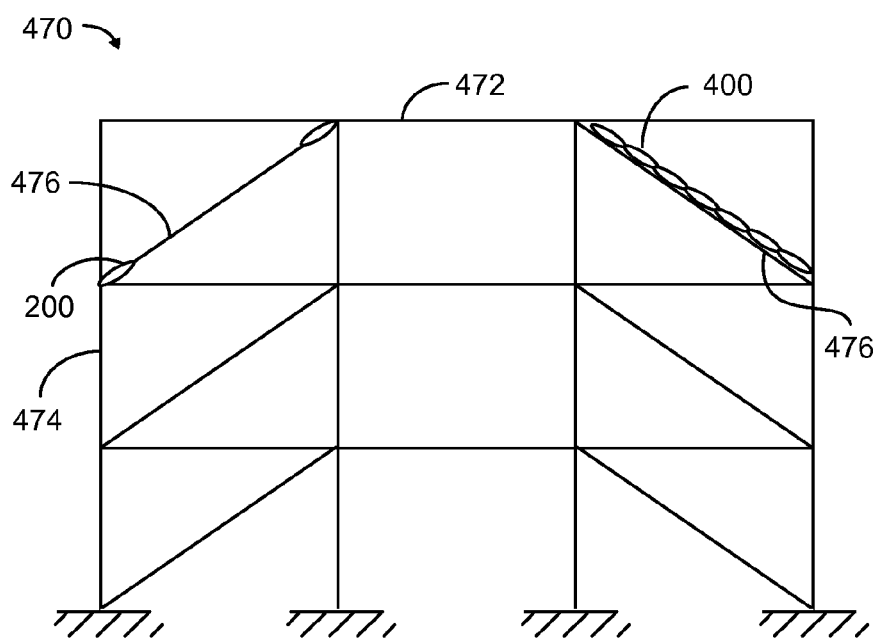
FIG. 17 is a side view of a frame system in accordance with one embodiment of a present invention.

Other examples of vibration damping systems are braced-frame systems, such as the braced-frame system 470 illustrated in FIG. 17. The exemplary braced-frame system 470 includes horizontal and vertical frame members 472 and 474, and braces 476. Vibration damping apparatus, such as damping apparatus 200, may be positioned in series with the braces 476 (e.g., at the longitudinal ends of the braces) and/or in parallel with the braces 476 (e.g., structural plates 400 that are coextensive with braces), and/or in series or parallel with the frame members 472 and 474. The damping apparatuses 200 may be configured to dampen low-amplitude vibrations before the remainder of the braced-frame system 470 acts on large amplitude motions.

Figure 18:
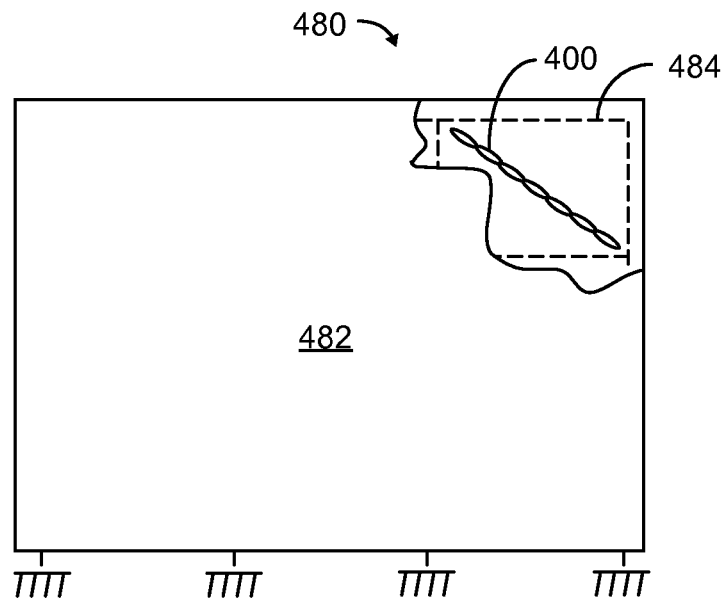
FIG. 18 is a side view of a shear wall in accordance with one embodiment of a present invention.
Figure 19:
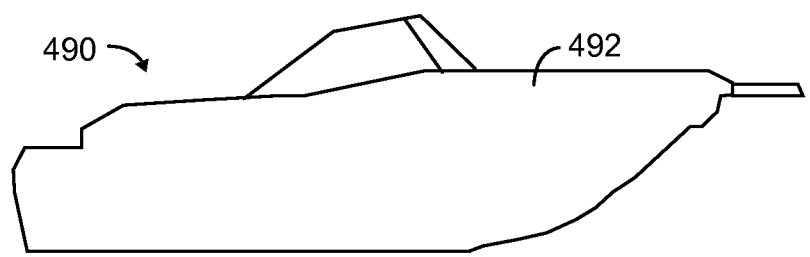
FIG. 19 is a side view of a boat hull in accordance with one embodiment of a present invention.

Turning to FIG. 18, the present vibration damping systems also have application in reinforced concrete shear walls. The exemplary shear wall 480 illustrated in FIG. 18 includes a concrete wall 482 mounted on a frame 484. Structural plates 400 may be embedded within the concrete. The structural plates 400 which may be oriented horizontally, vertically or at an angle in between (as shown), are stiffer than the concrete and therefore attract (and damp) vibrations.

Another exemplary application is boat hulls. The exemplary boat hull 490 illustrated in FIG. 19 incorporates one or more of the present vibration damping apparatus and/or systems. To that end, the exemplary boat hull 490 consists of an internal network of frames (not shown), that extend from side to side and that run the length of the boat, that are covered by an outer shell 492 (e.g., fiberglass or metal). Other boat hulls consist solely of the outer shell. The frames and/or shell may be formed from one or more of the above-described vibration damping apparatus and/or systems. The apparatus and systems illustrated in FIGS. 9, 10 and 15 are especially applicable to the outer shell of a boat hull.

Figure 20:
FIG. 20 is a side view of an airplane wing in accordance with one embodiment of a present invention.

The exemplary airplane wing 500 illustrated in FIG. 20 also incorporates one or more of the present vibration damping apparatus and/or systems. The exemplary wing 500 may include an external skin 502 and internal structures (not shown) such as ribs, stringers and spars. The external skin 502 and/or the internal structures may be formed from one or more of the above-described vibration damping apparatus and/or systems. The apparatus and systems illustrated in FIGS. 9, 10 and 15 are especially applicable to the external skin of an airplane wing.

Although the present inventions have been described in terms of the preferred embodiments above, numerous modifications and/or additions to the above-described preferred embodiments would be readily apparent to one skilled in the art. It is intended that the scope of the present inventions extends to all such modifications and/or additions.

We claim:

1. A vibration damping apparatus, comprising:
a displacement conversion device configured to convert displacement in a first direction into displacement in a second direction that is not the first direction;
a motion amplifier operably connected to the displacement conversion device and responsive to displacement in the second direction, the motion amplifier including a first spring defining a positive spring constant, an interface member and a second spring defining a negative spring constant that are connected in series; and
a motion damper operably connected to the motion amplifier interface member.

2. A vibration damping apparatus as claimed in claim 1, wherein
the displacement in the first direction comprises displacement along a first axis and the displacement in the second direction comprises displacement along a second axis.

3. A vibration damping apparatus as claimed in claim 2, wherein
the second axis is transverse to the first axis.

4. A vibration damping apparatus as claimed in claim 3, wherein
the second axis is perpendicular to the first axis.

5. A vibration damping apparatus as claimed in claim 1, wherein
the displacement conversion device includes a leaf spring.

6. A vibration damping apparatus as claimed in claim 1, wherein
the displacement conversion device includes a pair of leaf springs.

7. A vibration damping apparatus as claimed in claim 1, wherein
the displacement conversion device defines a first direction stiffness and a second direction stiffness that is less than the first direction stiffness.

8. A vibration damping apparatus as claimed in claim 1, wherein
the displacement conversion device defines a first direction spring constant and a second direction spring constant that is less than the first direction spring constant.

9. A vibration damping apparatus as claimed in claim 1, wherein
the positive spring constant and the negative spring constant define respective magnitudes and the negative spring constant magnitude is less than the positive spring constant magnitude.

10. A vibration damping apparatus as claimed in claim 1, wherein
the positive spring constant and the negative spring constant define respective magnitudes and the negative spring constant magnitude is about 1% to 10% less than the positive spring constant magnitude.

11. A vibration damping apparatus as claimed in claim 1, wherein
one or both of the first and second springs comprises a conical disc with stress-relieving cutouts.

12. A vibration damping apparatus as claimed in claim 1, wherein
the first and second springs are connected to one another by a rod; and
the interface member is carried by the rod.

13. A vibration damping apparatus as claimed in claim 12, wherein
the displacement conversion device defines a length and comprises first and second displacement conversion members that have respective inner and outer surfaces, the inner surfaces facing one another and being spaced apart from one another over at least a portion of the length of the displacement conversion device;
the first and second springs are on the outer surfaces of the first and second displacement conversion members; and
the rod extends through the first and second displacement conversion members.

14. A vibration damping apparatus as claimed in claim 13, wherein
the motion damper is located between the first and second displacement conversion members.

15. A vibration damping apparatus as claimed in claim 1, wherein
the motion damper comprises at least one fluid filled member.

16. A vibration damping apparatus as claimed in claim 1, wherein
the motion damper and the first spring define an integrated structure.

17. A method of damping vibrations, comprising the steps of:
converting a vibration-induced displacement in a first direction into a displacement in a second direction;
amplifying the displacement in the second direction with a positive spring and a negative spring to create an amplified displacement; and
damping the amplified displacement.

18. A method as claimed in claim 17, wherein
the displacement in the second direction is greater than the displacement in the first direction.

19. A method as claimed in claim 17, wherein
the step of converting a vibration-induced displacement comprises converting a vibration-induced displacement with a structure that is stiffer in the first direction than it is in the second direction.

* * * * *